April 16, 1957 W. P. SHORT ET AL 2,789,281
ICE DETECTOR
Filed March 15, 1954

INVENTORS.
WILLIAM P. SHORT
PHILIP D. GOODMAN
OSKAR E. MATTIAT

BY William J. Flynn
ATTORNEY

United States Patent Office 2,789,281
Patented Apr. 16, 1957

2,789,281

ICE DETECTOR

William P. Short, Medfield, Mass., and Philip D. Goodman, Lakeline, and Oskar E. Mattiat, Cleveland Heights, Ohio, assignors to Clevite Corporation, Cleveland, Ohio, a corporation of Ohio Application March 15, 1954, Serial No. 416,302

8 Claims. (Cl. 340—234)

This invention relates to a device for detecting the accretion of foreign material, such as ice.

There is a present need for a reliable device for detecting icing conditions. Such a device should find widespread application for general meteorological purposes, for detecting the formation of ice on highways, and also for detecting ice formation on aircraft, aerial missiles, and the like. While numerous devices for this general purpose have been tried they have not been entirely satisfactory for a variety of different reasons, such as undue complexity, inadequate sensitivity to the formation of ice, lack of dependability in operation and failure to indicate when they are not functioning properly, variations in their operating characteristics as a result of temperature changes, susceptibility to being rendered inoperative by the accretion of particles of foreign matter other than ice, such as dust or mud particles, inability to indicate the severity of icing conditions (i. e., the rate of ice build up), and other causes. The present invention is concerned with a device of general utility for ice detection purposes which avoids the defects and disadvantages of prior devices of this general type.

Accordingly, it is an object of this invention to provide a novel and improved ice detector.

It is also an object of the present invention to provide a novel and simplified ice detector which is quite sensitive to the formation of ice and at the same time is positive and dependable in operation.

Another object of this invention is to provide a novel ice detector whose sensitivity and operating characteristics do not change appreciably over the wide temperature range at which ice may form, and which, therefore, in its operation is substantially independent of air temperature.

Another object of this invention is to provide a novel ice detector having a "fail-safe" mode of operation; that is, which gives a warning signal when any of the components of the device becomes inoperative.

Another object of the present invention is to provide a novel ice detector which is substantially insensitive to water or snow, but which is quite sensitive to the accretion of an adherent film or layer of ice.

A further object of this invention is to provide a novel ice detector whose response to the formation of ice may be predetermined and adjusted, so that the response may be delayed until a predetermined thickness of ice has accumulated.

A still further object of this invention is to provide a novel ice detector which may be used to indicate the severity of icing conditions by determining the rate at which ice is forming.

A further object of this invention is to provide a novel ice detector adapted to indicate the formation of ice on the exposed surfaces of objects of small cross section, such as radio antennas on aircraft or the screens at the intake areas of jet engines.

A further object of this invention is to provide a novel ice detector having a novel and efficient arrangement for removing accumulated ice from its exposed portions.

The foregoing objectives are preferably accomplished in the present invention by the provision of an electromechanical transducer exposed to the formation of ice and arranged to control the frequency and the amplitude of signals from an electrical signal source, along with means responsive to the amplitude of those signals to detect the formation of ice on the transducer.

It is also an object of this invention generally to provide a novel automatically operative sensing apparatus for detecting the presence in the medium under test of solid material capable of forming an adherent mass on the sensing apparatus.

The foregoing, as well as other and further objects and advantages of the present invention will be apparent from the following description of the presently preferred embodiments thereof, illustrated in the accompanying drawing.

Referring to the drawing.

Figure 1:
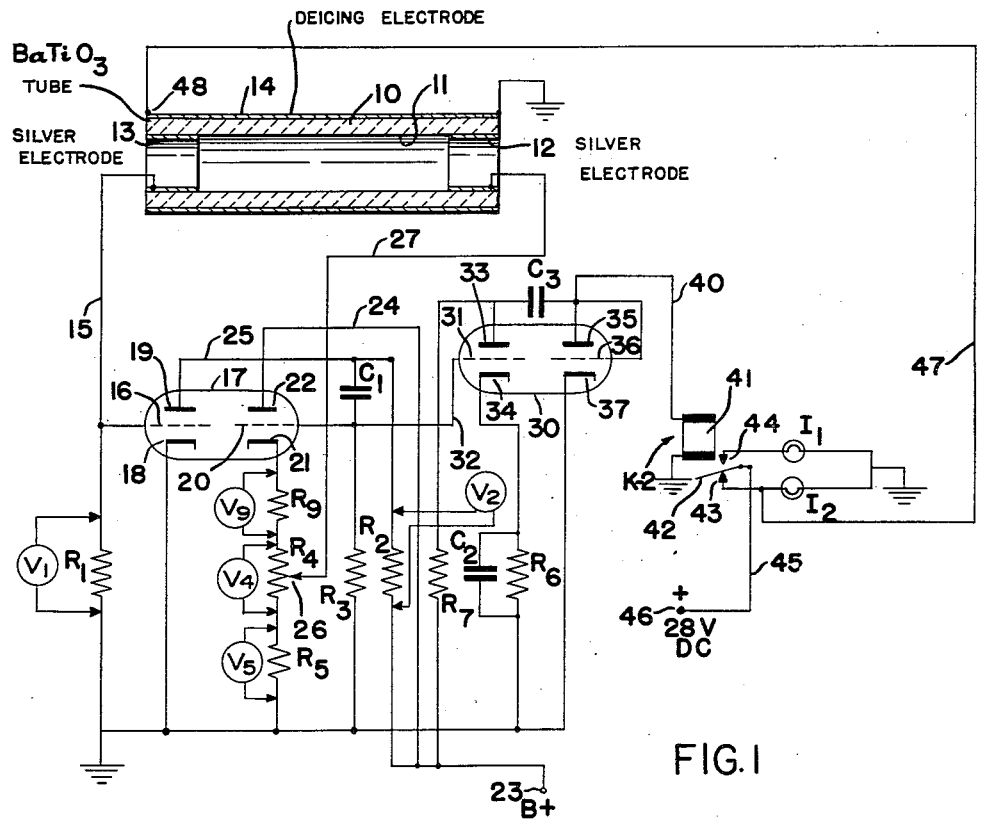
Figure 1 is a schematic diagram of the ice detector of the present invention incorporating a polarized barium titanate transducer of tubular form.

Referring to Fig. 1, in accordance with the present invention there is provided an electromechanical transducer in the form of a cylindrical tube 10 consisting essentially of permanently polarized ceramic barium titanate. As is well understood, permanently polarized ceramic barium titanate has a good piezoelectric response, enabling its use as a piezoelectric transducer, as disclosed in U. S. Letters Patent No. 2,486,560, to R. B. Gray. The tubular transducer element 10 is formed with an axial opening defined by its cylindrical inner side wall 11. At opposite ends of the transducer element 10 the inner side wall 11 is coated with silver electrodes 12 and 13, each of which extends completely around the inner side wall 11. The outer periphery of transducer element 10 is contacted throughout its entire extent by an electrode 14 of relatively high resistivity material, such as palladium, gold or platinum, which is provided for the purpose of deicing the transducer element 10 after ice has formed thereon. In a representative embodiment, the transducer element 10 may be 2 inches long, with an outer diameter of .375 inch and an inner diameter of .300 inch, and the electrodes 12 and 13 are each .375 inch long.

The tubular element 10 of permanently polarized ceramic barium titanate, which is piezoelectrically active, is electromechanically resonant at a particular fundamental frequency and harmonics thereof. In the above-specified embodiment the fundamental resonant frequency of the electroded tube is about 45 kilocycles per second. However, apparently because of its partial electroding at its ends, the tubular transducer element 10 is more readily excited at a relatively high harmonic of its fundamental frequency. In practice, the above-specified transducer element when mounted in a particular way has been found to exhibit greatest sensitivity at the fifth harmonic of its fundamental frequency, or 225 kilocycles per second, and is most readily excited at this frequency, although different harmonics may be most readily excited with different designs of the transducer element and different mounting arrangements therefor, so that this fifth harmonic operation is not to be regarded as critical, but merely illustrative of the operating conditions for one specific embodiment.

In the preferred embodiment of this invention the electroded transducer element 10 is connected in the feedback circuit of an amplifier so as to cause the amplifier to oscillate. The transducer element determines the frequency of the oscillator and also controls the amplitude of its output signal. Thus, referring to Fig. 1, the silver electrode 13 on one end of the barium titanate tube 10 is connected by a line 15 to the control grid 16 of the input half of a double triode tube 17 functioning as an amplifier. Resistor $R_1$ is connected between control grid 16 and its grounded cathode 18. The plate 19 of the input half of tube 17 is connected through a coupling condenser $C_1$ to the control grid 20 of the output half of tube 17 which functions to couple signal energy from the amplifier (input) half of tube 17 to the transducer 10. Resistor $R_3$ is connected between control grid 20 and ground. The cathode 21 of this output half of tube 17 is connected to ground through a cathode follower consisting of a fixed resistor $R_9$, a resistor $R_4$ having an adjustable tap 26 thereon, and a fixed resistor $R_5$, connected in series. The power supply voltage for the plate 22 of the output half of tube 17 is from a suitable positive terminal 23 through line 24, the potential on this plate being constant. The power supply voltage for the plate 19 of the input (amplifier) half of tube 17 is from terminal 23 through resistor $R_2$ and line 25.

The adjustable tap 26 on the cathode follower resistor $R_4$ is connected by line 27 to the silver electrode 12 on the opposite end of the tubular barium titanate transducer 10. It will be understood readily that the voltage drop across resistor $R_4$ will follow the changes in the voltage at plate 19, so that the voltage at tap 26 on resistor $R_4$ is representative of the output voltage of the amplifier (input) half of tube 17. This cathode follower connection from the amplifier half of tube 17 to the transducer electrode 12 has been found to be advantageous because of good impedance matching between these circuit components.

With the foregoing arrangement the output signal from the amplifier half of tube 17 is supplied to the electrode 12 at one end of the tubular barium titanate transducer element 10. The resulting mechanical vibration of the transducer element excites a voltage at the other electrode 13 at the opposite end of the transducer element. This voltage is fed back to the input control grid 16 in phase opposition (180° out of phase) to the output signal so that the transducer and tube 17 function as an oscillator, at a frequency determined by the transducer element 10.

If ice should form on the transducer element 10 the radiation resistance of this element will increase and it becomes progressively more difficult for the output voltage from tube 17 to cause the transducer element 10 to vibrate sufficiently to produce an adequate feedback voltage at the transducer electrode 13, so that the amplitude of the signals fed back through the transducer element 10 to the tube 17 will decrease. Ultimately, the oscillator signals will cease altogether in response to the formation of a predetermined thickness of ice on the tubular transducer element 10.

It should be noted that, with the above-described arrangement, the frequency of the oscillator is determined solely by the transducer element 10. Accordingly, the device is "self-tuning." Therefore, if due to temperature changes, or for any other reason, the frequency characteristic of the transducer element 10 should change, then the oscillator frequency will change correspondingly and continue to produce signal energy at the frequency at which the transducer element is most sensitive.

A relay, indicated generally at K–2, is arranged to respond to the interruption of the oscillator signals resulting from ice formation on the transducer element to operate a suitable indicator, as well as to actuate a de-icing arrangement for de-icing the transducer element upon which ice has accumulated.

To this end there is provided a double triode 30 arranged to have its input side function as an amplifier and its output side operate as a half-wave rectifier. The control grid 31 of the input half of this tube is connected by line 32 to the juncture of condenser $C_1$ and resistor $R_3$, whereby the potential at plate 19 of the amplifier half of tube 17 is applied to control grid 31 of the input (amplifier) half of tube 30. The plate 33 of the input half of tube 30 receives its power supply voltage from positive terminal 23 through resistor $R_7$. The cathode 34 of the input half of tube 30 is connected to ground through a conventional parallel combination of resistor $R_6$ and condenser $C_2$.

The potential at the plate 33 of the input half of tube 30 is supplied through condenser $C_3$ to the plate 35 of the output (rectifier) half of this tube. The grid 36 of the output half of tube 30 is connected directly to plate 35, so that this grid has no effect on the current in the output half of tube 30. The cathode 37 of this half of tube 30 is grounded.

With the foregoing arrangement it will be apparent that the input half of tube 30 functions as an amplifier, while the output half of this tube functions as a half-wave rectifier. Line 40 connects the plate 35 of tube 30 to the high side of the K–2 relay coil 41 to supply direct current to this relay coil. The other side of relay coil 41 is grounded. Obviously, the magnitude of the direct current supplied to the K–2 relay coil 41 is proportional to the amplitude of the signals generated by the oscillator which in turn is responsive to the formation of ice on the barium titanate transducer 10, as described.

The K–2 relay coil 41 controls a movable contact 42 adapted to contact either the upper fixed contact 44 or the lower fixed contact 43. A first indicator lamp $I_1$ is connected between upper fixed contact 44 and ground, while a second indicator lamp $I_2$ is connected between lower fixed contact 43 and ground. When the K–2 relay coil 41 is de-energized, or insufficiently energized, the movable contact engages the lower stationary contact 43. Conversely, when the K–2 relay coil 41 is sufficiently energized it pulls the movable contact 42 up into engagement with the upper stationary contact 44. The movable contact 42 is connected by a line 45 to a 28 volt D. C. source terminal 46, so that one or the other of the indicator lamps $I_1$ and $I_2$ is energized from this source, depending upon the position of the movable relay contact 42.

Obviously, any other suitable indicator, such as a bell or other audible signal device, could be substituted in place of the indicator lamps.

In the absence of ice on the transducer element 10, the oscillator functions to produce oscillations of sufficient amplitude so that the rectified signal to relay K–2 is of sufficient magnitude to maintain the movable relay contact 42 in engagement with the upper fixed contact 44, thereby maintaining lamp $I_1$ energized. This lamp may be green, for example, and when illuminated indicates the absence of ice accretion of the transducer element 10.

In response to the formation of ice on the transducer element 10, the oscillations cease and consequently the rectified signal to relay K–2 drops to zero, so that the movable relay contact 42 drops into engagement with lower fixed contact 43 to energize lamp $I_2$. This lamp may be red, and when illuminated it indicates the formation of ice on the transducer element 10.

When the movable relay contact 42 drops into engagement with the lower fixed contact 43 it also completes an energization circuit for the de-icing electrode 14 on the outer surface of the transducer element 10, as follows: from the 28 volt D. C. terminal 46 through line 45, relay contacts 42, 43 and line 47 to a terminal 48 at one end of the de-icing electrode 14 on the transducer 10. The other end of electrode 14 is grounded. Preferably, the de-icing electrode has a resistance within the range from about 2 to 10 ohms. When the de-icing electrode 14 is thus connected to the D. C. source terminal 46, in response to the formation of ice on the transducer 10, sufficient current flows through this electrode to melt the ice which has accumulated thereon. After this ice has been removed, which takes only about 30 seconds or less, the transducer element 10 starts to vibrate again sufficiently to cause the amplitude of the oscillator signal to return to its former value. Then, the D. C. signal to relay coil 41 is sufficient in magnitude to energize this relay coil enough to pull the movable contact 42 up against the fixed contact 44, thereby energizing indicator lamp $I_1$ and de-energizing lamp $I_2$ and the de-icing electrode 14. Thus, the present device accumulates ice and de-ices itself so as to be ready to detect the reaccumulation of ice in a cyclic sequence, so that it is responsive to the continuation of icing conditions as long as they persist.

It will be noted that the relay coil 41 is so connected that the indicator lamp $I_2$ will be illuminated in response to failure of either of the double triodes 17 and 30 in the control circuit and will remain illuminated until noticed by the operator. Of course, this will maintain the voltage source 46 connected to the de-icing electrode 14 so that ice cannot build up at this time. Therefore, the device has a "fail-safe" mode of operation.

The sensitivity of the device to the formation of ice on the transducer tube 10 may be adjusted, within limits, by varying the position of the adjustable tap 26 on the cathode follower resistor $R_4$ to thereby selectively vary the amount of signal energy fed back through the transducer element 10. Because of this, the loading on the transducer resulting from ice build up thereon may be made more or less critical in determining when the relay coil 41 will permit the movable relay coil 42 to drop into engagement with the fixed relay contact 43. Accordingly, such adjustment enables the device to operate such that it responds only after a predetermined thickness of ice has built up on the transducer 10.

With the foregoing arrangement, it is possible to operate the device to indicate the severity of icing conditions by determining the rate at which the ice is forming on the transducer element 10. This may be done by noting the rate at which the indicator $I_2$ is being energized, by measuring the voltage at any point in the amplifier where there is an A. C. signal, such as across $R_1$, $R_2$ or any of the cathode resistors $R_9$, $R_4$ and $R_5$, or by measuring the D. C. voltage across $R_1$ with a high impedance D. C. voltmeter. For this purpose, suitable voltmeters $V_1$, $V_2$, $V_3$, $V_4$ and/or $V_5$, respectively, may be provided in the circuit, as shown in Figure 1.

The above-described transducer element has been found to be quite insensitive to the deposition of water or snow on its exposed surfaces since moisture in these forms does not appreciably alter the radiation resistance of the transducer element 10. However, the transducer is sharply affected by the build-up of ice on its exposed surfaces since the ice, apparently because of its mass, increases the radiation resistance of the transducer. Because of this characteristic, the present device is particularly dependable for ice detecting purposes since it will not give a spurious response when water or snow accumulates.

Because of the sensitivity of response of which the present device is capable, it is capable of responding to the formation of ice substantially as soon as ice begins to form on exposed parts of small cross-section, such as aircraft radio antennas, the screens at the intake areas of jet engines, and the like. This is quite advantageous since ice usually tends to accumulate first on such surfaces, even before building up on the leading edges of the wings.

The particular de-icing arrangement of the present invention is quite effective since the heat for melting the accumulated ice is applied to the electrode 14 which is at the interface between the ice and the transducer element 10, which insures maximum efficiency in the removal of the ice.

Figure 3:
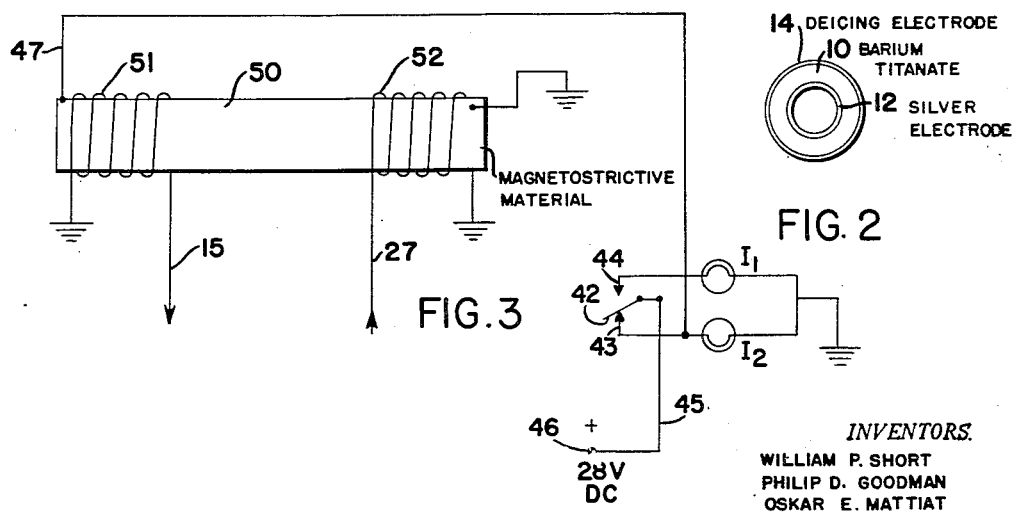
Figure 3 is a schematic diagram showing a magnetostrictive transducer adapted to be connected in the Fig. 1 circuit to provide an alternative ice detector in accordance with the present invention.
Figure 2:
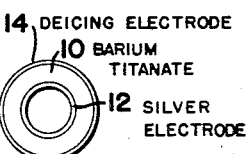
Figure 2 is an end view of the tubular barium titanate transducer element in Fig. 1.

It is to be understood that the present invention is not limited to the use of a piezoelectric device as the electromechanical transducer. For example, as indicated in Fig. 3 the electro-mechanical transducer may be of the magnetostrictive type. In Fig. 3 the elongated bar 50 of magnetostrictive material, such as nickel would be suitably mounted so as to be exposed to the formation of ice. At one end, a coil 51 surrounds the magnetostrictive element 50. This coil has one of its ends connected to the line 15 leading to the input of an amplifier, identical to the Fig. 1 arrangement. The other end of coil 51 is grounded. At the other end of the magnetostrictive element 50 there is provided a coil 52, which surrounds this end of the magnetostrictive element. One end of coil 52 is grounded, while the other end is connected to line 27 leading to the tap 26 on the cathode resistor $R_4$ in the Fig. 1 circuit.

As is well understood, the magnetostrictive transducer 50—52 of Fig. 3 is resonant at a particular fundamental frequency and harmonics thereof. When connected as the feedback element for an amplifier similar to that of Fig. 1, the magnetostrictive transducer coacts with the amplifier to cause the system to function as an oscillator, with the magnetostrictive transducer controlling the amplitude of the oscillations and their frequency. The remainder of the circuit functions as described above to detect the formation of ice on the magnetostrictive element 50, with the same advantages in operation as above mentioned. In the Fig. 3 arrangement, for removing ice from the magnetostrictive transducer after it has formed thereon, line 47 may be connected to one end of the magnetostrictive rod 50 and the other end of this rod grounded, so that, upon de-energization of relay coil 41 as in the Fig. 1 circuit, current is passed from the terminal 46 through the magnetostrictive rod 50 to heat the latter and thereby melt the ice thereon.

It is to be understood that, while there have been described above and illustrated in the accompanying drawing two preferred embodiments of the present invention, various modifications, omissions and refinements which depart from these disclosed embodiments may be adopted without departing from the spirit and scope of this invention. Also, while the primary utility of the present invention is in connection with the detection of ice, it may be used generally to determine the presence in particular media of material other than ice which when adherent to the transducer element is capable of stopping or seriously attenuating its vibration.

We claim:

1. An ice detector comprising an oscillator having a feedback circuit, a piezoelectric transducer containing polarized ceramic barium titanate connected in said feedback circuit and having a natural resonant frequency which determines the frequency at which the oscillator operates, said transducer being exposed to the formation and accretion of ice thereon and controlling the amplitude of the oscillator output, and means responsive to the amplitude of the oscillator output to detect the formation of ice on said transducer.

2. An ice detector comprising an amplifier, a tube consisting essentially of permanently polarized ceramic barium titanate, spaced electrodes contacting the inner wall of said tube at opposite ends thereof, one of said electrodes being coupled to the input to the amplifier and the other of said electrodes being coupled to the output of the amplifier so that said tube is a feedback element for the amplifier causing the amplifier to produce oscillations at a frequency at which the barium titanate tube resonates and having an amplitude controlled by the attenuation of the signals along the barium titanate tube, a rectifier coupled to the output of said amplifier, a relay connected to the output of said rectifier, and means responsive to the operation of said relay to indicate the condition of ice formation on said barium titanate tube.

3. An ice detector comprising a tubular piezoelectric transducer exposed to the formation of ice and consisting primarily of polarized ceramic barium titanate, a conductive electrode on the outer wall of the tubular transducer, and means responsive to the formation of ice on said transducer to send current through said electrode to melt the ice accumulated thereon.

4. An ice detector comprising an oscillator, a sensing unit exposed to the formation and accretion of ice thereon and the loading effect of such ice, said sensing unit comprising ceramic titanate material having a substantial electromechanical response, electrodes contacting said ceramic titanate material at spaced locations along said sensing unit and connecting said sensing unit in said oscillator to control the operation of the oscillator, and means responsive to the operation of the oscillator to indicate the loading effect of ice on said sensing unit.

5. The ice detector of claim 4, wherein said sensing unit is a tube, and said electrodes contact said ceramic titanate material on the inner face of the tube at opposite ends of the tube.

6. The ice detector of claim 5, wherein there is provided a conductive de-icing electrode on the outer face of the tube, and means responsive to the formation of ice on said tube to pass current through said de-icing electrode to melt the ice accumulated thereon.

7. An ice detector comprising an oscillator, a tube of ceramic titanate material having a substantial electromechanical response exposed to the loading effect of ice, spaced electrodes contacting the tube at either end thereof and connecting the tube in said oscillator to control the operation of the oscillator, and means responsive to the operation of the oscillator to indicate the loading effect of ice on said tube.

8. An ice detector comprising an oscillator, a tube of polarized barium titanate exposed to the formation of ice, spaced electrodes contacting the inner face of the tube at either end of the tube and connecting the tube in the oscillator to control the amplitude of the oscillator signals, and means responsive to the cessation of the oscillator signals to indicate the formation of ice on said tube.

References Cited in the file of this patent

UNITED STATES PATENTS

| | | |
|---|---|---|
| 2,414,756 | May | Jan. 21, 1947 |
| 2,419,266 | Kliever et al. | Apr. 22, 1947 |
| 2,421,166 | Sherlock | May 27, 1947 |
| 2,538,114 | Mason | Jan. 16, 1951 |
| 2,566,813 | Thorsen | Sept. 4, 1951 |